US011805411B2

(12) United States Patent
Wang et al.

(10) Patent No.: US 11,805,411 B2
(45) Date of Patent: Oct. 31, 2023

(54) ESTABLISHING CONNECTIONS BETWEEN WIFI ACCESS POINTS AND WIRELESS DEVICES VIA LIGHT FIDELITY ACCESS POINTS

(71) Applicant: Telefonaktiebolaget LM Ericsson (publ), Stockholm (SE)

(72) Inventors: Keven Wang, Sollentuna (SE); Athanasios Karapantelakis, Solna (SE); Konstantinos Vandikas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 728 days.

(21) Appl. No.: 16/607,207

(22) PCT Filed: May 11, 2017

(86) PCT No.: PCT/EP2017/061308
§ 371 (c)(1),
(2) Date: Oct. 22, 2019

(87) PCT Pub. No.: WO2018/206107
PCT Pub. Date: Nov. 15, 2018

(65) Prior Publication Data
US 2020/0382958 A1 Dec. 3, 2020

(51) Int. Cl.
*H04L 29/06* (2006.01)
*H04W 12/06* (2021.01)
(Continued)

(52) U.S. Cl.
CPC .......... *H04W 12/06* (2013.01); *H04B 10/116* (2013.01); *H04B 10/1149* (2013.01);
(Continued)

(58) Field of Classification Search
CPC ..... H04W 12/06; H04W 84/12; H04W 88/08; H04W 76/10; H04W 4/06
See application file for complete search history.

(56) References Cited

U.S. PATENT DOCUMENTS 9,066,227 B2 * 6/2015 Spencer ................ H04W 76/10
9,503,891 B2 * 11/2016 Yun ..................... H04W 12/069
(Continued)

FOREIGN PATENT DOCUMENTS

WO 2016186539 A1 11/2016

OTHER PUBLICATIONS

International Search Report and Written Opinion of the International Searching Authority for PCT International Application No. PCT/EP2017/061308 dated Jan. 23, 2018.
(Continued)

*Primary Examiner* — Jayesh M Jhaveri
(74) *Attorney, Agent, or Firm* — SAGE PATENT GROUP

(57) ABSTRACT

A method by a WiFi AP for setting-up a WiFi connection with a wireless device, includes sending WiFi service credentials to a Light Fidelity (Li-Fi) AP for transmission through Li-Fi signaling that is broadcast for reception by wireless devices. The method receives and authenticates an authentication request that is received via a RF transceiver of the WiFi AP from the wireless device, which is responding to the WiFi service credentials that were broadcast through the Li-Fi signaling. The method then establishes a WiFi RF connection with the wireless device responsive to the authentication.

21 Claims, 9 Drawing Sheets

(51) Int. Cl.

| | | |
|---|---|---|
| H04W 76/10 | (2018.01) | |
| H04B 10/114 | (2013.01) | |
| H04B 10/116 | (2013.01) | |
| H04W 4/06 | (2009.01) | |
| H04W 12/0431 | (2021.01) | |
| H04W 84/12 | (2009.01) | |
| H04W 88/08 | (2009.01) | |

(52) U.S. Cl.
CPC ......... *H04W 4/06* (2013.01); *H04W 12/0431* (2021.01); *H04W 76/10* (2018.02); *H04W 84/12* (2013.01); *H04W 88/08* (2013.01)

(56) References Cited

U.S. PATENT DOCUMENTS

| | | | |
|---|---|---|---|
| 10,034,314 B2 * | 7/2018 | White | H04W 16/24 |
| 2014/0056172 A1 * | 2/2014 | Lee | H04W 76/10 |
| | | | 370/254 |
| 2014/0059643 A1 * | 2/2014 | Azuma | H04W 12/06 |
| | | | 726/2 |
| 2014/0208387 A1 * | 7/2014 | Ganesh | H04W 12/50 |
| | | | 726/4 |
| 2016/0196218 A1 * | 7/2016 | Kumar | H04L 9/085 |
| | | | 713/193 |
| 2017/0180327 A1 * | 6/2017 | Levin | G06F 21/6218 |
| 2018/0115539 A1 * | 4/2018 | Muhanna | H04W 88/02 |

OTHER PUBLICATIONS

Shao et al., "Design and Analysis of a Visible-Light-Communication Enhanced WiFi System," Journal of Optical Communications and Networking, vol. 7, No. 10, Oct. 2015, pp. 960-973.

* cited by examiner

ESTABLISHING CONNECTIONS BETWEEN WIFI ACCESS POINTS AND WIRELESS DEVICES VIA LIGHT FIDELITY ACCESS POINTS

CROSS REFERENCE TO RELATED APPLICATION

This application is a 35 U.S.C. § 371 national stage application of PCT International Application No. PCT/EP2017/061308, filed on May 11, 2017, the disclosure and content of which is incorporated herein by reference in its entirety.

TECHNICAL FIELD

The present disclosure relates generally to networking systems and methods and more particularly to establishing connections between IEEE 802.11 (WiFi) access points and wireless devices.

BACKGROUND

Wireless devices can connect to WiFi networks using either an open system or shared key authentication method.

After a probing process that lets a wireless device discover WiFi service credentials, such as a service set identifier (SSID) for a wireless network provided by a WiFi access point (AP), the wireless device sends an authentication request. In an open system case, the WiFi AP authenticates the wireless device, and the wireless device can then connect to the network. This means that in an open system case any wireless device issuing an authentication request can be authenticated, which can be problematic since the SSID in the authentication request can be freely defined or changed by the wireless device. This open authentication process is most often used when a wireless device will access a captive portal, where wireless devices connected to a WiFi AP must complete a further authentication before being allowed over-the-top access to the Internet or another service provided through the WiFi AP.

The most widely used authentication process involves a shared key that is used in a challenge-response exchange based on the RC4 algorithm. The WiFi AP generates a random challenge and sends it to the wireless device. A client on the wireless devices uses its shared key established with the WiFi AP to encrypt the challenge and send it back to the WiFi AP for authentication.

Regardless of the authentication approach, the communications used to establish a WiFi connection between wireless devices and a WiFi AP is done over the same RF spectrum, e.g., 2.4 or 5 GHz bands, as that used for subsequent network access. For mass bootstrapping of wireless devices (for example in a Smart Home or a Factory floor), issues can arise with the WiFi authentication.

First, these wireless devices need to be configured with a WiFi password, such as a WEP Key or WPA-WPA2 passphrase depending on the security protocol used, which the WiFi AP will use to authenticate the device.

Second, these wireless devices need to choose the correct WiFi AP from among a list of discovered WiFi APs in the area. Configuring every device with a service set identifier (SSID), passphrase/password may be time consuming and costly, especially when many WiFi APs having different SSIDs and passphrases/passwords, such as when WiFi APs are spaced apart in a factory.

Third, due to the properties of radio waves (and especially for lower frequency networks), the radio communications may be prone to eavesdroppers that can decrypt a password for a certain SSID. Although WPA and WPA2 standards are much more secure than older WEP, there are still opportunities where the WiFi network can become compromised.

SUMMARY

Some embodiments disclosed herein are directed to a method by a WiFi access point (AP) for setting-up a WiFi connection with a wireless device. The method includes sending WiFi service credentials to a Light Fidelity (Li-Fi) AP for transmission through Li-Fi signaling that is broadcast for reception by wireless devices. The method receives and authenticates an authentication request that is received via a RF transceiver of the WiFi AP from the wireless device, which is responding to the WiFi service credentials that were broadcast through the Li-Fi signaling. The method then establishes a WiFi RF connection with the wireless device responsive to the authentication.

A potential advantage of this approach is localization of authentication process. For example, a group of wireless devices located in a room or group of rooms can receive the same WiFi service credentials being broadcasted by one or more Li-Fi APs that are located to provide communication coverage in the one or more rooms. Another group of wireless devices located in another room or another group of rooms can simultaneously receive other WiFi service credentials. Li-Fi communication systems use visible light for communication between the Li-Fi APs and the wireless devices. Because such light-based Li-Fi signaling is limited to line-of-sight and cannot penetrate walls and closed doors, the groups of wireless devices are isolated from each others' broadcasted WiFi service credentials. Establishing WiFi RF connections for groups of wireless devices to different WiFi APs can be more securely performed and with less operational involvement of users or while avoiding use of complex operational processes that attempt to achieve such isolation through RF signaling.

Some other embodiments are directed to a corresponding WiFi AP that includes at least one transceiver, at least one processor coupled to the at least one transceiver, and at least one memory coupled to the at least one processor and storing program code that when executed by the at least one processor causes the at least one processor to perform operations. The operations include sending WiFi service credentials to a Li-Fi AP for transmission through Li-Fi signaling that is broadcast for reception by wireless devices. The operations further include receiving and authenticating an authentication request received via a RF transceiver of the WiFi AP from the wireless device responding to the WiFi service credentials that were broadcast through the Li-Fi signaling, and establishing a WiFi RF connection with the wireless device responsive to the authentication.

Some other embodiments are directed to a wireless device for setting-up a WiFi connection with a WiFi AP. The method includes receiving WiFi service credentials through Li-Fi signaling from a Li-Fi AP that is broadcast for reception by wireless devices. The method sends an authentication request through a RF transceiver of the wireless device to the WiFi access point, the authentication request being generated based on the WiFi service credentials received through the Li-Fi signaling, and establishes a WiFi RF connection with the WiFi AP based on the authentication request.

Some other embodiments are directed to a corresponding wireless device that includes at least one transceiver, at least one processor coupled to the at least one transceiver, and at least one memory coupled to the at least one processor and storing program code that when executed by the at least one processor causes the at least one processor to perform operations. The operations include receiving WiFi service credentials through Li-Fi signaling from a Li-Fi AP that is broadcast for reception by wireless devices. The operations include sending an authentication request through a RF transceiver of the wireless device to the WiFi access point, the authentication request being generated based on the WiFi service credentials received through the Li-Fi signaling. The operations further include establishing a WiFi RF connection with the WiFi AP based on the authentication request.

Other methods, WiFi APs, and wireless devices according to embodiments will be or become apparent to one with skill in the art upon review of the following drawings and detailed description. It is intended that all such additional methods, WiFi APs, and wireless devices be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Figure 1:
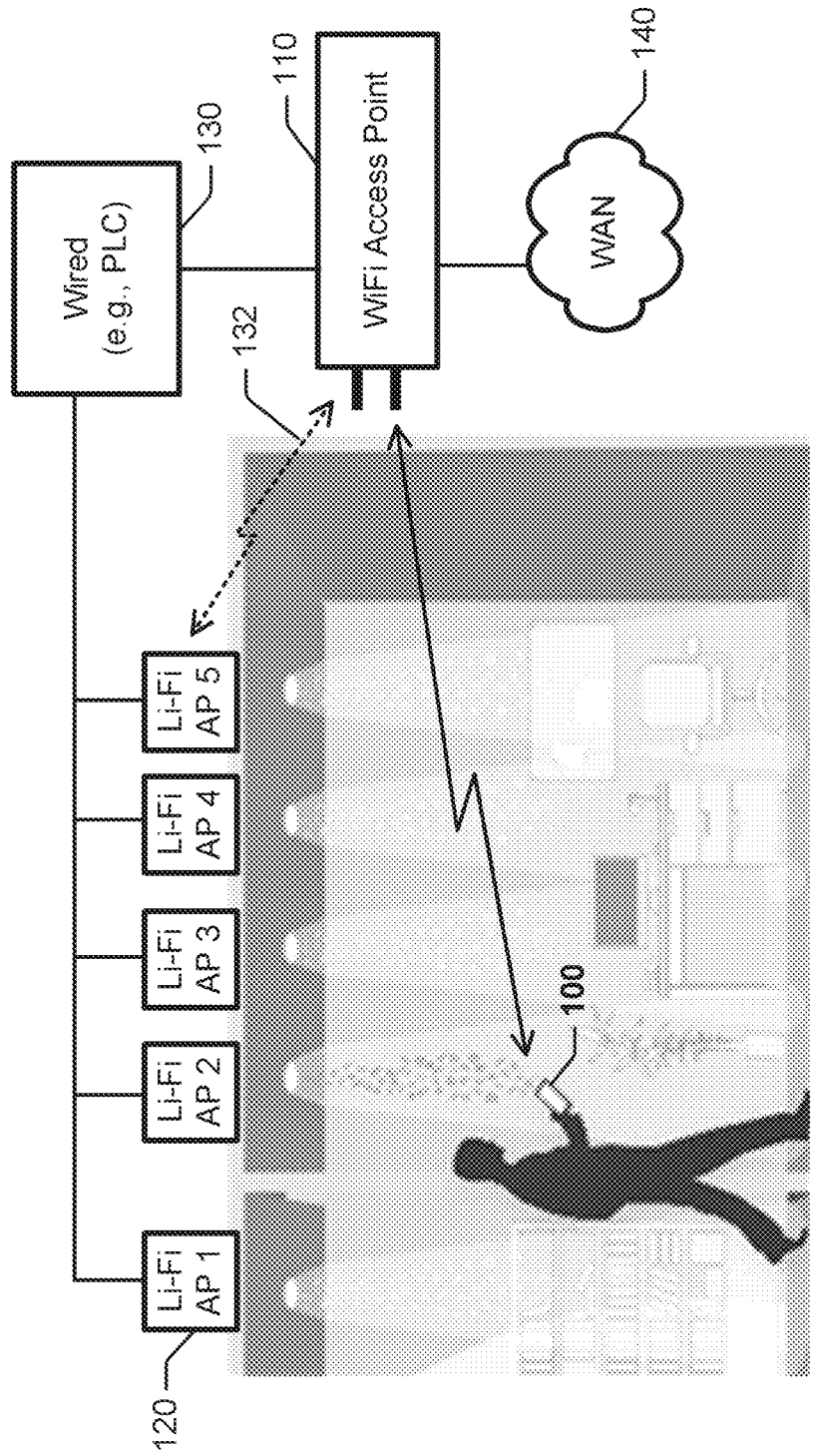
FIG. 1 is a block diagram of a system that includes a WiFi AP that communicates through one or more Li-Fi APs to setup a WiFi RF connection with a wireless device in accordance with some embodiments of the present disclosure.

FIG. 1 is a block diagram of a system that includes a WiFi AP 110 that communicates through one or more Li-Fi APs 120 (e.g., Li-Fi APs 1 . . . 5) to setup a WiFi RF connection with a wireless device 100 in accordance with some embodiments of the present disclosure. The Li-Fi APs 120 are connected to the WiFi AP 110 through a wireless connection 132 and/or through a wired network 130, which may include Ethernet, a powerline communication (PLC) connection through a shared power line, etc., or other wired/wireless connections. The Li-Fi APs 120 emit Li-Fi signals and receive Li-Fi signals emitted by the wireless device 100, to provide communication services in their respective coverage areas. The Li-Fi signals may be within the visible light portion of the electromagnetic spectrum and encoded to communicate data between the wireless device 100 and the Li-Fi APs 120 for routing through, e.g., the wired network 130 to the WiFi AP 110 and the wide area network (WAN) 140. In the illustrated example, spatially adjacent Li-Fi APs 120 have partially overlapping or nearly overlapping coverage areas. The WiFi AP 110 operates to communicate through one or more of the Li-Fi APs 120 with the wireless device 100 to establish a WiFi RF connection with the wireless device 100.

Figure 2:
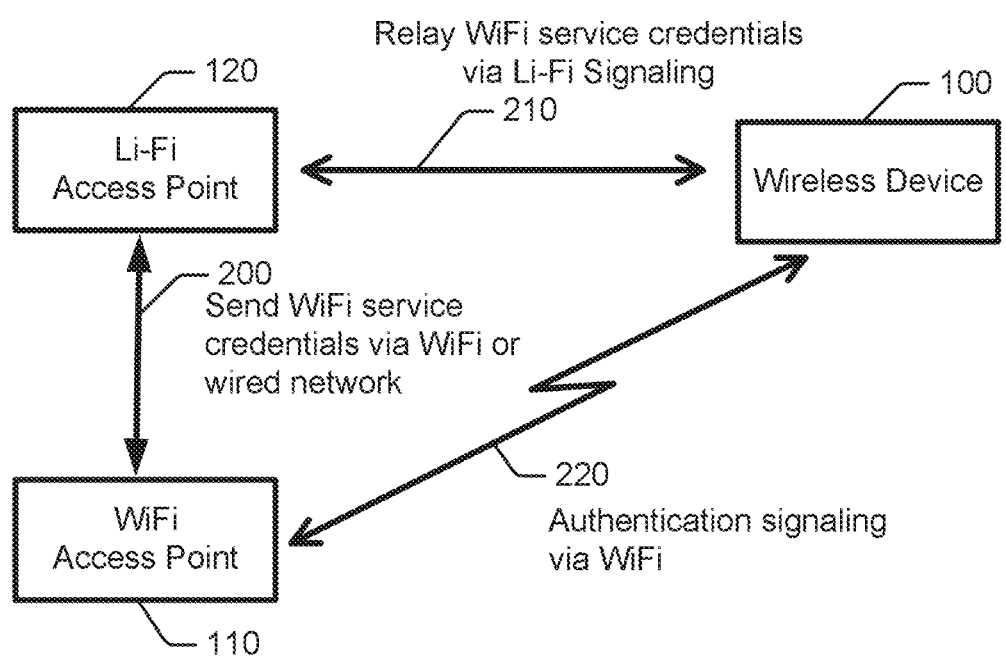
FIG. 2 is a block diagram that illustrates communication flows between the WiFi AP, the Li-Fi AP, and the wireless device of FIG. 1 to establish a WiFi RF connection with the wireless device, in accordance with some embodiments of the present disclosure.

FIG. 2 is a block diagram that illustrates communication flows between the WiFi AP 110, the Li-Fi AP 120, and the wireless device 100 of FIG. 1 to establish a WiFi RF connection with the wireless device 100, in accordance with some embodiments of the present disclosure. Referring to FIG. 2, the WiFi AP 110 sends WiFi service credentials via RF, wired, or sound signaling 200 toward the Li-Fi AP 120 for relay transmission through Li-Fi signaling 210 that is broadcast for reception by wireless devices, including the wireless device 100. The wireless device 100 sends an authentication request through RF signaling 220 to the WiFi AP 110, where the authentication request is generated based on the WiFi service credentials received through the Li-Fi signaling. The WiFi AP 110 receives and authenticates the authentication request, and establishes a WiFi RF connection with the wireless device 100 responsive to the authentication.

Figure 3:
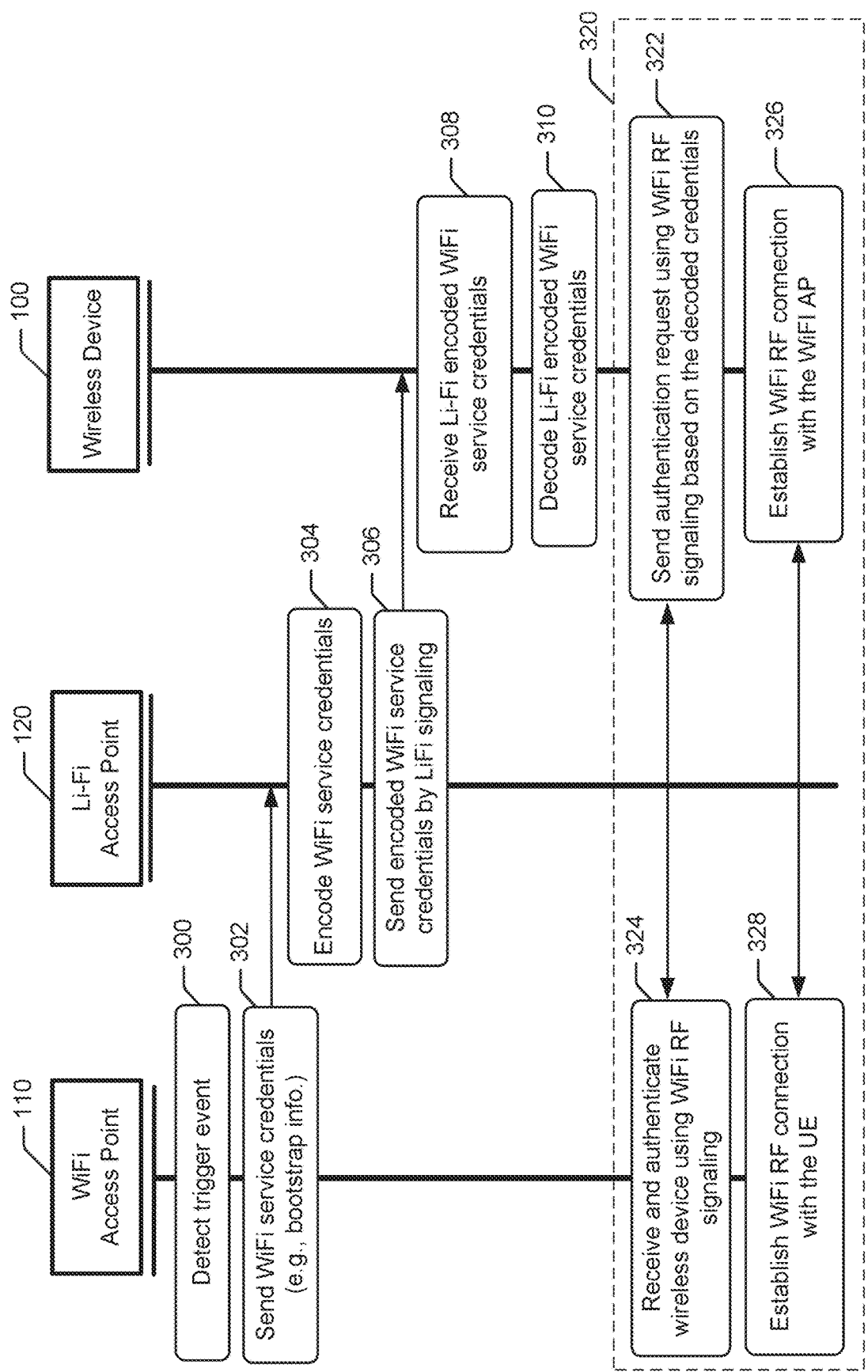
FIG. 3 is a combined data flow diagram and flowchart of operations by the WiFi AP, the Li-Fi AP, and the wireless device of FIGS. 1 and 2, in accordance with some embodiments of the present disclosure.

FIG. 3 is a combined data flow diagram and flowchart of operations by the WiFi AP 110, the Li-Fi AP 120, and the wireless device 100 of FIGS. 1 and 2, in accordance with some embodiments of the present disclosure. Referring to FIG. 3, the WiFi AP 110 detects 300 a trigger event, which may correspond to a user actuating a user interface to provide a command and/or may correspond to expiration of a running timer (e.g., periodic event). Responsive to the event, the WiFi AP 110 sends 302 WiFi service credentials (e.g., bootstrap information) to the Li-Fi AP 120. The WiFi service credentials may be sent in a message containing a Service Set IDentifier (SSID) for a WiFi network provided by the WiFi AP 110 and containing an access key for the WiFi network. The access key may correspond to WEP key, WPA-WPA2 passphrase, etc. The message can be addressed to the Li-Fi AP 120 and be sent through a wired network connection (e.g. ethernet) to the Li-Fi AP, a WiFi RF connection to the Li-Fi AP, and/or a sound signaling network.

The Li-Fi AP 120 encodes 304 the WiFi service credentials to generate Li-Fi encoded service credentials that are sent 306 by Li-Fi signaling to the wireless device 100. The wireless device 100 receives 308 the Li-Fi encoded service credentials, which it decodes 310 to extract the WiFi service credentials. The wireless device 100 sends 322 an authentication request through a RF transceiver of the wireless device 100 to the WiFi AP 110. The authentication request is generated based on the WiFi service credentials received through the Li-Fi signaling.

The WiFi AP 110 receives and authenticates 324 the authentication request received via a RF transceiver of the WiFi AP 110 from the wireless device 100. The wireless device 100 and the WiFi AP 110 then communicate through WiFi RF signaling to establish 326, 328 a WiFi RF connection responsive to the authentication request.

A potential advantage of this approach is that a group of wireless devices located in a room or group of rooms can be receive the same WiFi service credentials being broadcasted by one or more Li-Fi APs that are located to provide communication coverage in the one or more rooms. Another group of wireless devices located in another room or another group of rooms can simultaneously receive other WiFi service credentials. Li-Fi communication systems use visible light for communication between the Li-Fi APs and the wireless devices. Because such light-based Li-Fi signaling is limited to line-of-sight and cannot penetrate walls and closed doors, the groups of wireless devices are isolated from each others' broadcasted WiFi service credentials. Establishing WiFi RF connections for groups of wireless devices to different WiFi APs can thereby be more easily and securely performed.

Figure 4:
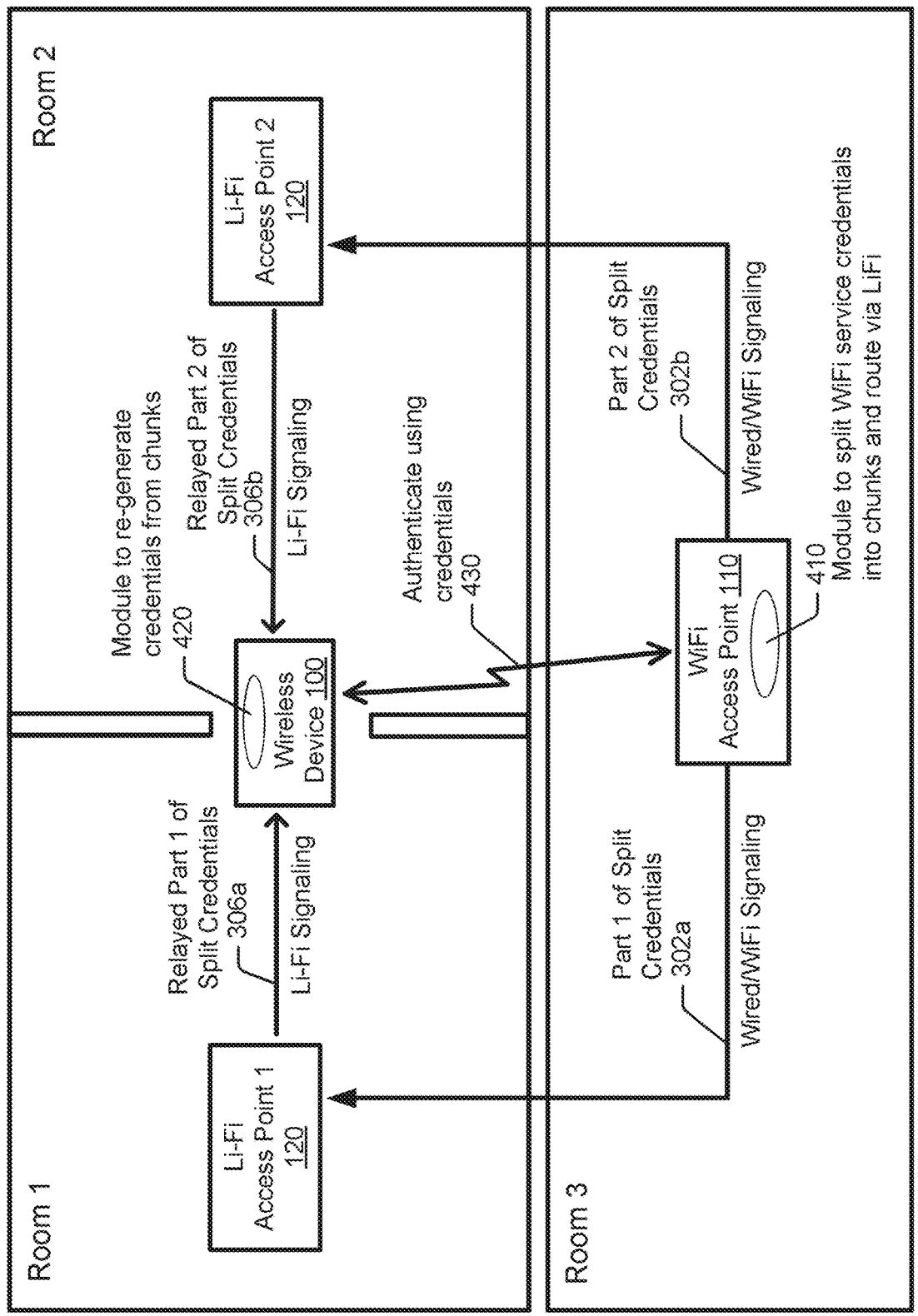
FIG. 4 is a block diagram that illustrates communication flows between a WiFi AP and two Li-Fi APs located in adjacent rooms to setup a WiFi RF connection with a wireless device that is located within the coverage areas of both Li-Fi APs or is transported through coverage areas, in accordance with some embodiments of the present disclosure.

FIG. 4 is a block diagram that illustrates communication flows between a WiFi AP 110 and two Li-Fi APs 120 (Li-Fi AP 1 and Li-Fi AP2) located in adjacent rooms (Room 1 and Room 2) to setup a WiFi RF connection with a wireless device 100 that is located within the coverage areas of both Li-Fi APs or is transported through coverage areas, in accordance with some embodiments of the present disclosure. In the illustration of FIG. 4 the wireless device 100 is located in a doorway between rooms 1 and 2, where it can simultaneously receive Li-Fi signaling from both Li-Fi APs 120. In some other embodiments, the wireless device 100 is configured to receive and store signaling from a plurality of Li-Fi APs 120 while is being transported through their respective coverage areas.

In contrast to the embodiment of FIG. 3, the WiFi AP 110 in FIG. 4 is configured to send the WiFi service credentials through a plurality of Li-Fi APs 120 for receipt by the wireless device 100. Moreover, the WiFi AP 110 of FIG. 4 can split the WiFi service credentials into a plurality of chunks that are spread across messages which are dispersed to the different ones of the plurality of Li-Fi APs 120. The wireless device 100 needs to receive all of the chunks, or in some other embodiments at least a threshold number of the chunks, to be able to regenerate the credentials therefrom for use in generating an authentication request that is communicated to the WiFi AP 110.

With further reference to FIG. 4, the WiFi AP 110 contains a module 410 that splits the WiFi service credentials into a plurality of chunks, spreads the plurality of chunks across a plurality of messages, and addresses at least some of the messages to different ones of Li-Fi APs 120 (i.e., Li-Fi AP 1 and Li-Fi AP 2). The WiFi AP 110 then sends the messages to the addressed ones of the Li-Fi APs 120. The Li-Fi APs 120 relay the received messages through their respective Li-Fi signaling broadcast in their coverage areas.

The wireless device 100 includes a module 420 that is configured to receive, through Li-Fi signaling from the plurality of the Li-Fi APs 120, the chunks which are spread across the messages. The module 420 re-generates the WiFi service credentials from the chunks. The wireless device 100 then uses the re-generated WiFi service credentials to generate an authentication request, which it sends 430 through a RF transceiver of the wireless device 100 to the WiFi AP 110. The wireless device 100 and the WiFi AP 110 then perform further WiFi RF communications to establish a WiFi RF connection based on the authentication request (e.g., based authentication of the dedication request by the WiFi AP 110).

With further reference to FIG. 4, the WiFi AP 110, by the module 410, may embed a sequence number in each of the messages that indicates locations of the chunks in a sequence to be use by the wireless device to re-generate the WiFi service credentials from the chunks. The wireless device 100, by the module 420, can determine locations of the chunks in the sequence for which they are to be used when re-generating the WiFi service credentials, based on the sequence numbers embedded in the received messages.

In particular example of FIG. 4, the WiFi AP 110 splits the WiFi service credentials into two chunks (parts 1 and 2). Part 1 is sent through pathway 302a addressed to Li-Fi AP 1 for relay via pathway 306a to the wireless device 100, and Part 2 is sent through pathway 302b addressed to Li-Fi AP 2 for relay via pathway 306b to the wireless device 100.

Figure 5:
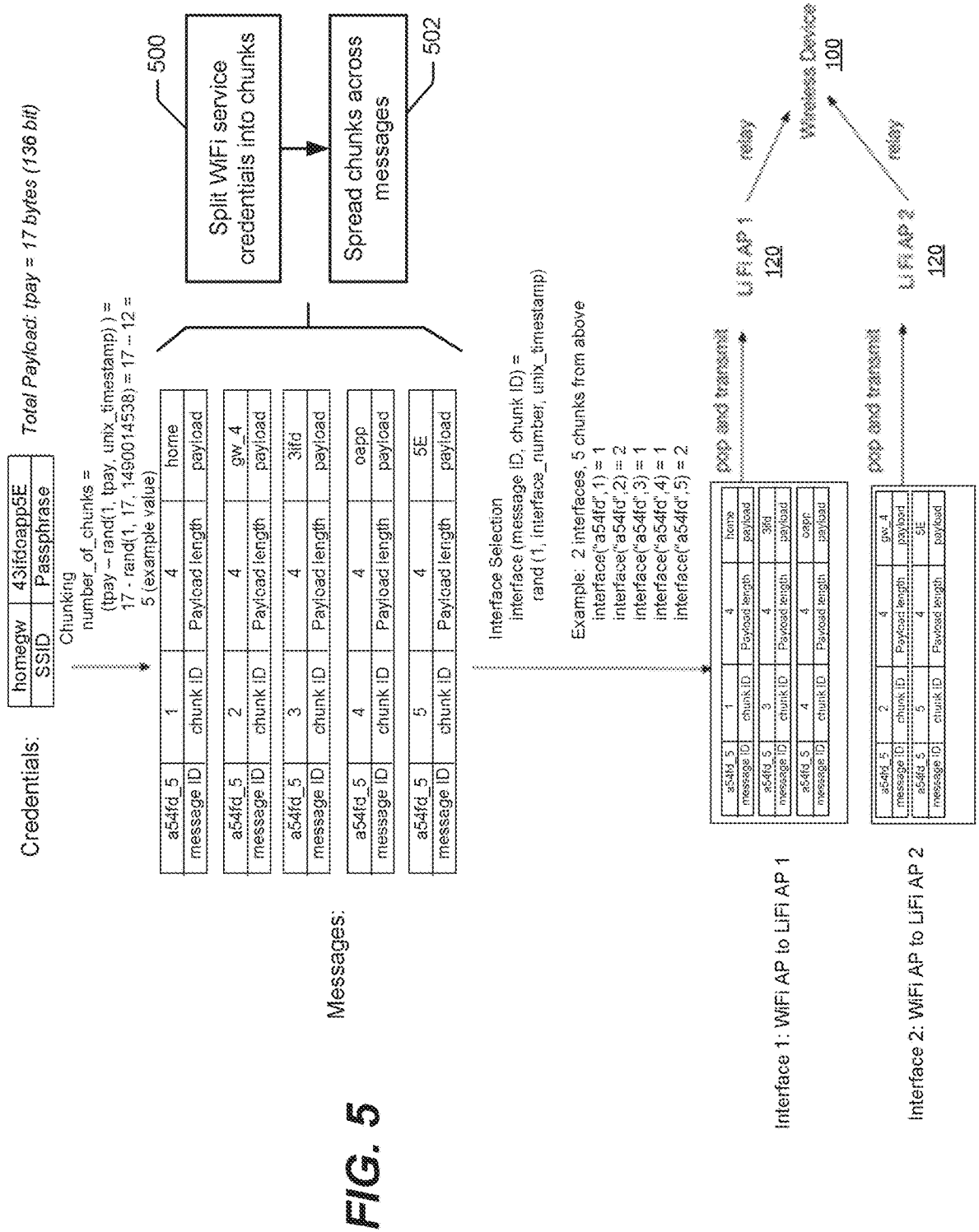
FIG. 5 illustrates operations for splitting WiFi service credentials into chunks that are spread across messages sent to the wireless device, in accordance with some embodiments of the present disclosure.

FIG. 5 illustrates operations for splitting WiFi service credentials into chunks that are spread across messages sent to the wireless device 100, in accordance with some embodiments of the present disclosure. Referring to FIG. 5, the WiFi service credentials include a SSID and a passphrase. The WiFi AP 110 splits (block 500) the WiFi service credentials into five chunks that are spread (block 502) across five different messages. Three of the messages (containing chunk identifiers 1, 3, 4) are sent through interface 1 from the WiFi AP 110 to the Li-Fi AP 1 for relay through Li-Fi signaling to the wireless device 100. The other two messages (containing chunk identifiers 2 and 5) are sent through interface 2 from the WiFi AP 110 to the Li-Fi AP 2 for relay through Li-Fi signaling to the wireless device 100.

It is noted that in FIG. 5 the message ID includes a generated alphanumeric and a sequence number identifying a sequence order of a chunk contained in the message. The message ID and the sequence number can be used by the wireless device 100 for verification of which chunks are to be combined during regeneration of a WiFi service credential, and to determine the order in which the chunks are to be combined during regeneration operations. The randomization function shown in the pseudocode ("rand") can be a standard pseudo-random number generator, which generates an integer between the first and second argument and uses a seed number four a third argument (shown as a Unix timestamp which should change, e.g., every millisecond).

In another embodiment, another way of splitting the WiFi service credentials into chunks is for the WiFi AP 110 to send a message that is addressed to the Li-Fi AP 1 in Room 1 and contains a Service Set Identifier (SSID) for the WiFi network provided by the WiFi AP 110. The WiFi AP 110 also sends another message that is addressed to the Li-Fi AP 2 in Room 2 and contains an access key (e.g., password/passkey) for the WiFi network. The wireless device 100 then determines the WiFi service credentials from the separately received SSID and access key.

Some other embodiments are directed to constraining access to the WiFi AP 110 to wireless devices that are located at certain physical locations. With continued reference to FIG. 4, for example, the WiFi AP 110 may want to allow wireless devices located in Room 1 to establish communication connections, but also want to prohibit wireless devices located in Room 2 from establishing communication connections. The WiFi AP 110 can therefore be configured to select a Li-Fi AP 120 from among a set of Li-Fi APs 120, which are dispersed within a building and each communicatively connected to the WiFi AP 110, based on the Li-Fi AP 120 being determined to be at a location within the building wherein a WiFi RF connection is allowed to be established. The WiFi AP 110 then sends the WiFi service credentials to the selected Li-Fi AP 120, e.g., Li-Fi AP 1 in Room 1, for relay to wireless devices within its Li-Fi coverage area. The WiFi AP 110 can correspondingly prohibiting sending of the WiFi service credentials to another Li-Fi AP, e.g., Li-Fi AP 2 in Room 2, among the set of Li-Fi APs based on the other Li-Fi AP being determined to be at another location within the building where a WiFi RF connection is not allowed to be established with the WiFi AP 110.

The WiFi AP 110 may determine which Li-Fi APs 120 among the set of Li-Fi APs 120 are at locations where a WiFi RF connection is allowed to be established with the WiFi AP 110, based on accessing a data structure repository that associates identifiers of the Li-Fi APs in the set of Li-Fi APs with indications of whether the associated Li-Fi APs are located where WiFi RF connections are allowed to be established with the WiFi AP 110.

By way of further example with reference to FIG. 4, the WiFi AP 110 can access the data structure repository to identify Li-Fi AP 1 in Room 1 and Li-Fi AP 2 in Room 2 as providing Li-Fi coverage in Rooms 1 and 2, where the WiFi AP 110 has been authorized to allow wireless devices to connect to it. The WiFi AP 110 can respond to that determination by sending the entire WiFi service credentials to each of the Li-Fi AP 1 in Room 1 and Li-Fi AP 2 in Room 2.

Alternatively, the WiFi AP 110 may further require that a wireless device must receive a partial chunk of the WiFi service credentials from the Li-Fi AP 1 in Room 1 and another partial chunk of the WiFi service credentials from the Li-Fi AP 2 in Room 2. The WiFi AP 110 can therefore send the partial WiFi service credential chunks to the different Li-Fi APs according to the operations described above for FIG. 4. The wireless devices located within overlapping coverage areas of both Li-Fi AP 1 and Li-Fi AP 2 can receive the partial WiFi service credential chunks for use in regenerating the WiFi service credentials. Other wireless devices may need to be transported from Room 1 to Room 2, or vice versa, to sequentially receive the partial WiFi service credential chunks needed for regenerating the WiFi service credentials. Depending upon the coverage areas of Li-Fi AP 1 and Li-Fi AP 2, it may be advantageous to force users to move from one room to another room in order to receive the necessary partial WiFi service credential chunks for use in obtaining access to the WiFi AP 110, which can be accomplished by sending the partial WiFi service credentials chunks different Li-Fi APs located in a plurality of spaced apart rooms.

Figure 6:
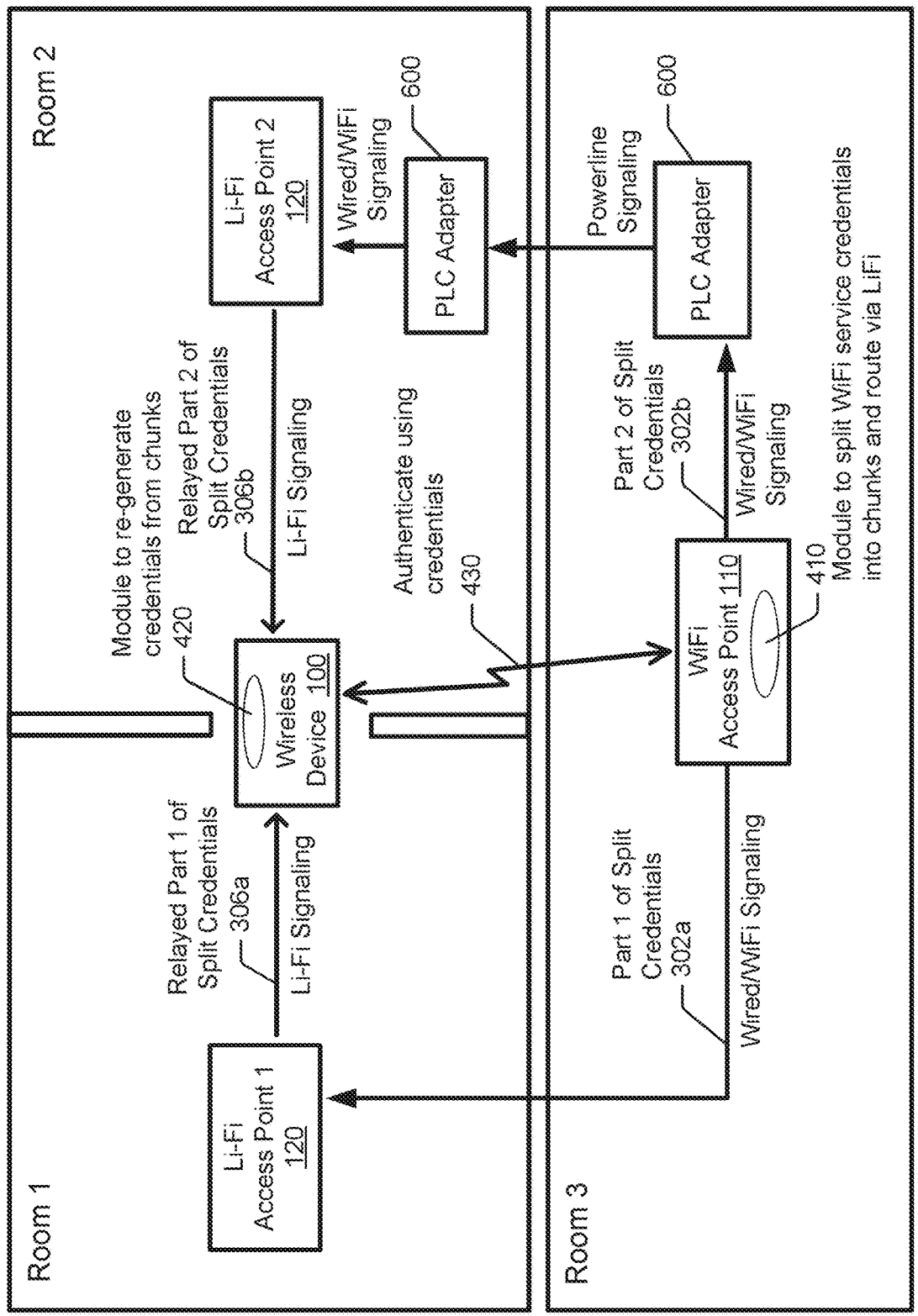
FIG. 6 is a block diagram that illustrates communication flows between a WiFi AP and two Li-Fi APs located in adjacent rooms, via power line communication adapters, to setup a WiFi RF connection with a wireless device that is located within the coverage areas of both Li-Fi APs or is transported through coverage areas, in accordance with some embodiments of the present disclosure.

FIG. 6 is a block diagram that illustrates communication flows between a WiFi AP 110 and two Li-Fi APs 120 ("Li-Fi AP 1" and "Li-Fi AP 2") located in adjacent rooms ("Room 1", "Room 2"). The illustrated elements and message flows shown in FIG. 6 that have the same number as those shown in FIG. 4 may operate in the manner explained for FIG. 4. FIG. 6 differs in that it includes a pair of power line communication (PLC) adapters 600 which enable the WiFi AP 110 to communicate with the Li-Fi AP 2 (120) located in "Room 2" via powerline signaling. More particularly, the WiFi AP 110 sends the messages containing the Part 2 chunks of the split WiFi service credentials through wired or WiFi signaling pathway 302b to one of the PLC adapter 600. The PLC adapter 600 encodes the messages containing the Part 2 chunks for transmission through a power line extending to the other PLC adapter 600 located in "Room 2", which decodes and sends the messages containing the Part 2 chunks through wired or WiFi signaling to the Li-Fi AP 2 (120) for forwarding to the wireless device 100 through Li-Fi signaling 306b.

Figure 7:
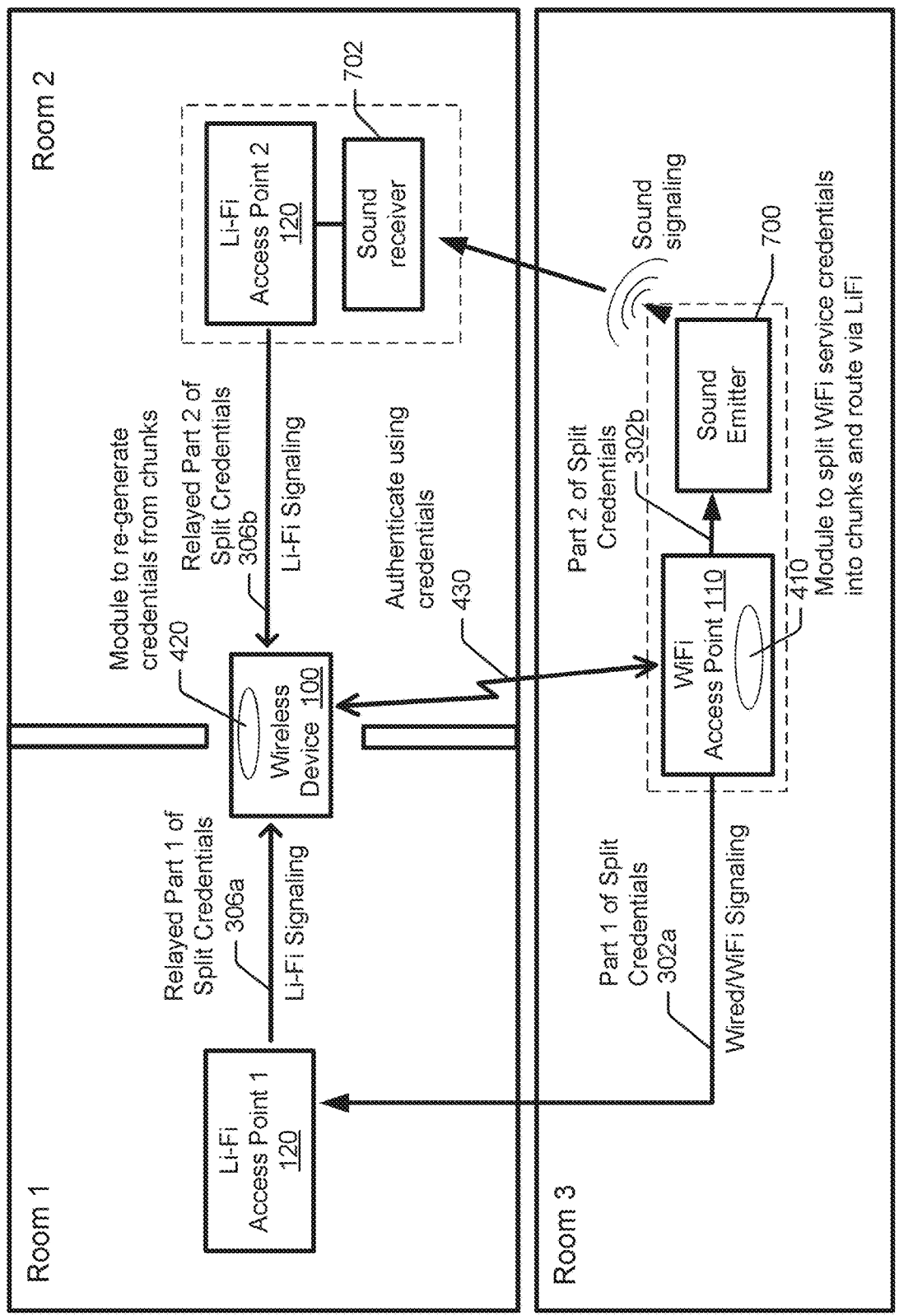
FIG. 7 is a block diagram that illustrates communication flows between a WiFi AP and two Li-Fi APs located in adjacent rooms, via sound signaling, to setup a WiFi RF connection with a wireless device that is located within the coverage areas of both Li-Fi APs or is transported through coverage areas, in accordance with some embodiments of the present disclosure.

FIG. 7 is a block diagram that illustrates communication flows between a WiFi AP 110 and two Li-Fi APs 120 ("Li-Fi AP 1" and "Li-Fi AP 2") located in adjacent rooms ("Room 1", "Room 2"). The illustrated elements and message flows shown in FIG. 7 that have the same number as those shown in FIG. 4 may operate in the manner explained for FIG. 4. FIG. 7 differs in that the messages containing the Part 2 chunks are transported through sound signaling to a sound receiver associated with the Li-Fi AP 2 (120) located in "Room 2."

The WiFi AP 110 sends the messages containing the Part 2 chunks to a sound emitter 700 which encodes the messages for output from the sound emitter 700 as sound signaling that transports the sound receiver 702. The sound signaling may be within the audible frequency range of humans or may be outside the audible frequency range. The sound emitter 700 may be within the WiFi AP 110 or may be separate there from but connected thereto through a wired or wireless connection.

Figure 8:
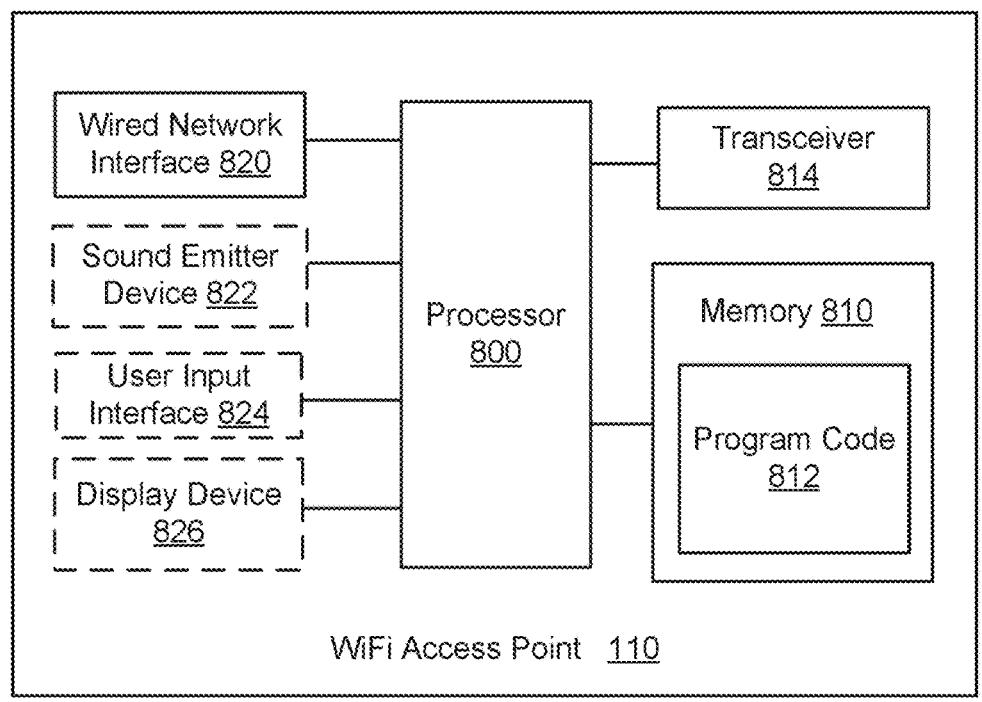
FIG. 8 is a block diagram of a WiFi AP that is configured according to some embodiments of the present disclosure.

FIG. 8 is a block diagram of a WiFi AP 110 that is configured according to some embodiments of the present disclosure. The WiFi AP 110 includes at least one processor 800 (processor), at least one memory 810 (memory), and at least one transceiver 814 (transceiver). The WiFi AP 110 can include a wired network interface 820 that communicates with a Li-Fi AP through a wired network, such as Ethernet or a power line communication protocol. The WiFi AP 110 may additionally or alternatively include a sound emitter device 822 configured to generate sound signaling (e.g., using human range audible or non-audible sound) that transports messages toward the Li-Fi AP, such as to a microphone within the Li-Fi AP or to a sound network adapter that receives the sound signaling and relays the messages to the Li-Fi AP.

The processor 800 may include one or more data processing circuits, such as a general purpose and/or special purpose processor (e.g., microprocessor and/or digital signal processor) that may be collocated or distributed across one or more networks. The processor 800 is configured to execute computer program code 812 in the memory 810, described below as a non-transitory computer readable medium, to perform at least some of the operations described herein as being performed by a WiFi AP 110. The WiFi AP 110 may further include a user input interface 824 (e.g., touch screen, keyboard, keypad, etc.) and a display device 826.

The memory 810 may include a data structure repository that associates identifiers of Li-Fi APs in a set of Li-Fi APs with indications of whether the associated Li-Fi APs are located where WiFi RF connections are allowed to be established with the WiFi AP 110. The processor may access the data structure repository to identify one or more Li-Fi APs that provide communication coverage to the allowed areas, and send its Wi-Fi service credentials to the identify one or more Li-Fi APs for broadcast through Li-Fi signaling to any wireless devices located in the communication coverage area(s).

Figure 9:
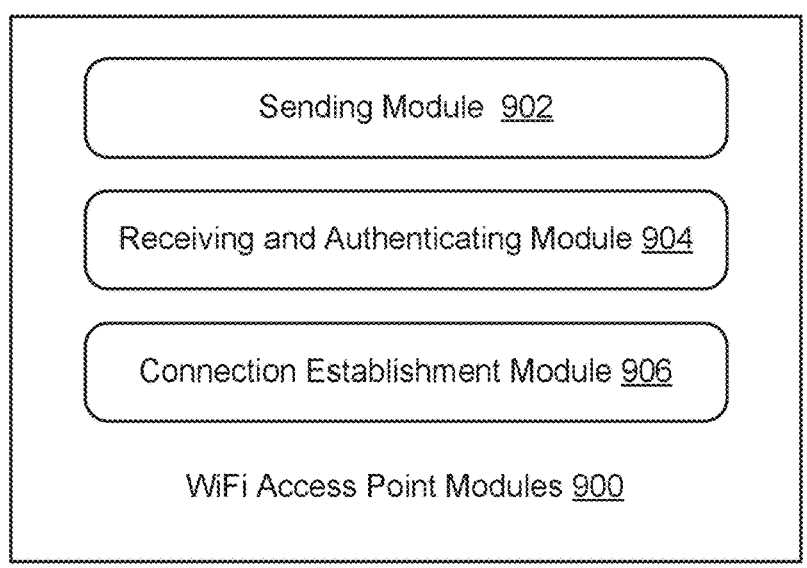
FIG. 9 is a block diagram of modules forming a WiFi AP that are configured according to some embodiments of the present disclosure.

FIG. 9 is a block diagram of modules 900 forming a WiFi AP that is configured according to some embodiments of the present disclosure. Referring to FIG. 9, the modules 900 include a sending module 902, a receiving and authenticating module 904, and a connection establishment module 906. The sending module 902 is configured for sending WiFi service credentials to a Li-Fi AP for transmission through Li-Fi signaling that is broadcast for reception by wireless devices. The receiving and authenticating module 904 is configured for receiving and authenticating an authentication request received via a RF transceiver of the WiFi AP from the wireless device responding to the WiFi service credentials that were broadcast through the Li-Fi signaling. The connection establishment module 906 is configured for establishing a WiFi RF connection with the wireless device responsive to the authentication. One or more of the modules may be configured to perform any of the other operations for one or more of embodiments of a WiFi AP disclosed herein.

Figure 10:
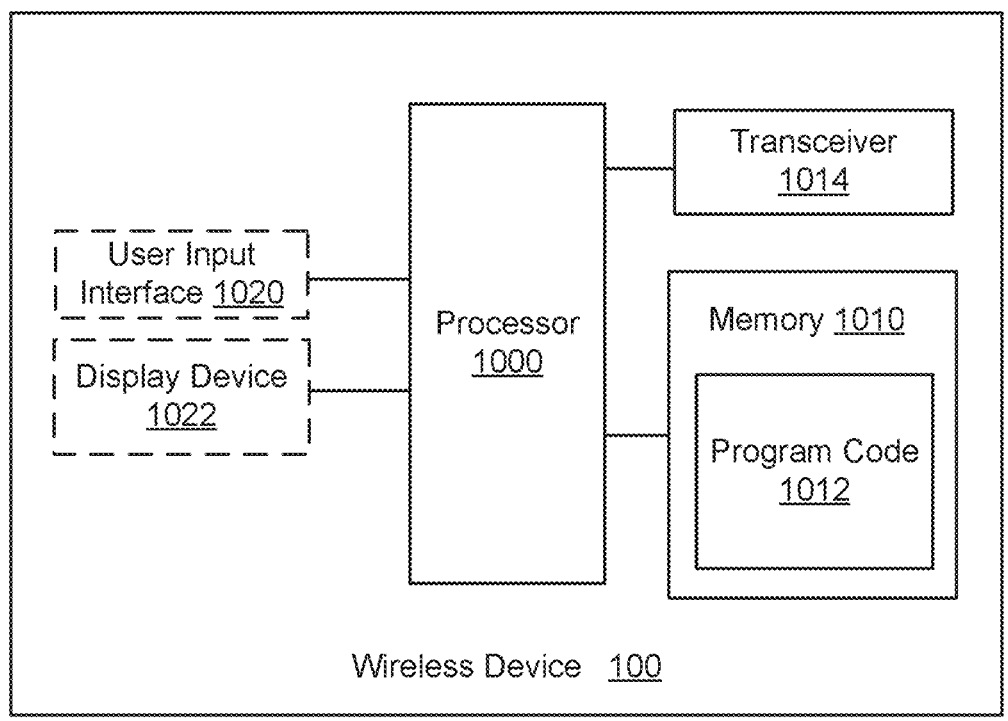
FIG. 10 is a block diagram of a wireless device that is configured according to some embodiments of the present disclosure.

FIG. 10 is a block diagram of a wireless device 100 that is configured according to some embodiments of the present disclosure. The wireless device 100 includes at least one processor 1000 (processor), at least one memory 1010 (memory), and at least one transceiver 1014 (transceiver). The memory 1010 is coupled to the processor 1000 and stores program code.

The processor 1000 may include one or more data processing circuits, such as a general purpose and/or special purpose processor (e.g., microprocessor and/or digital signal processor) that may be collocated or distributed across one or more networks. The processor 1000 is configured to execute computer program code 1012 in the memory 1010, described below as a non-transitory computer readable medium, to perform at least some of the operations described herein as being performed by a wireless device. The wireless device 100 may further include a user input interface 1020 (e.g., touch screen, keyboard, keypad, etc.) and a display device 1022.

The wireless device 100 may be any type of electronic device that is configured to communicate through a RF wireless interface and a Li-Fi wireless interface. The wireless device 100 operates in a client mode to the WiFi AP, and may be another WiFi AP or Li-Fi AP. The wireless device 100 may be Station (STA) consistent with IEEE 802.11 terminology. Other examples of wireless devices are target device, device to device (D2D) user equipment (UE), machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

Figure 11:
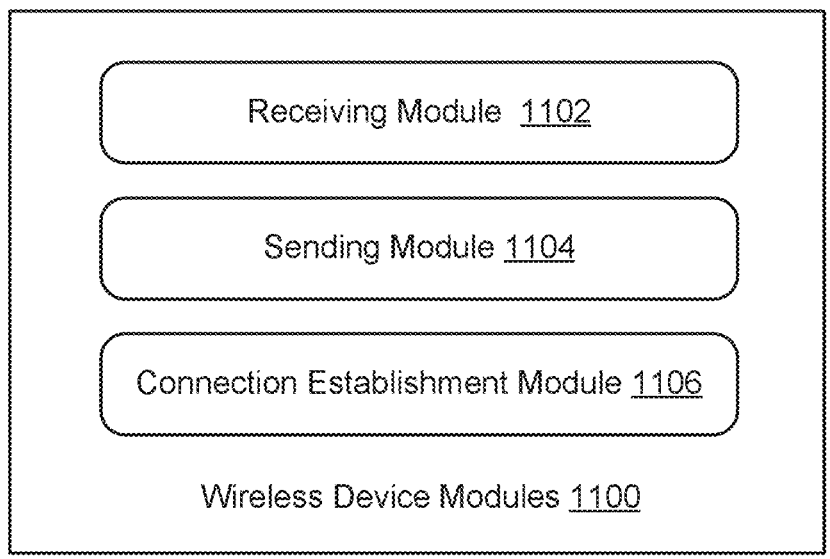
FIG. 11 is a block diagram of modules forming a wireless device that are configured according to some embodiments of the present disclosure.

FIG. 11 is a block diagram of modules 1100 forming a wireless device that is configured according to some embodiments of the present disclosure. Referring to FIG. 11, the modules 1100 include a receiving module 1102, a sending module 1104, and a connection establishment module 1106. The receiving module 1102 is configured for receiving WiFi service credentials through Li-Fi signaling from a Li-Fi AP that is broadcast for reception by wireless devices. The sending module 1104 is configured for sending an authentication request through a RF transceiver of the wireless device to the WiFi access point. The authentication request is generated based on the WiFi service credentials received through the Li-Fi signaling. The connection establishment module 1106 is configured for establishing a WiFi RF connection with the WiFi AP based on the authentication request. One or more of the modules may be configured to perform any of the other operations for one or more of embodiments of a WiFi AP disclosed herein.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a WiFi access point, AP, for setting-up a WiFi connection with a wireless device, the method comprising:
   selecting a Light Fidelity, Li-Fi AP from among a set of Li-Fi APs, which are dispersed within a building and each communicatively connected to the WiFi AP, based on the Li-Fi AP being determined to be at a location within the building wherein a WiFi RF connection is allowed to be established;
   sending WiFi service credentials to the Li-Fi AP for transmission through Li-Fi signaling that is broadcast for reception by wireless devices;
   prohibiting sending of the WiFi service credentials to at least one other Li-Fi AP among the set of Li-Fi APs based on the other Li-Fi AP being determined to be at another location within the building where the WiFi RF connection is not allowed to be established;
   receiving and authenticating an authentication request received via a RF transceiver of the WiFi AP from the wireless device responding to the WiFi service credentials that were broadcast through the Li-Fi signaling; and
   establishing the WiFi RF connection with the wireless device responsive to the authentication.

2. The method of claim 1, wherein sending WiFi service credentials to the Li-Fi AP, comprises:
   sending a message to the Li-Fi AP containing a Service Set IDentifier (SSID) for a WiFi network provided by the WiFi AP and containing an access key for the WiFi network.

3. The method of claim 1, wherein sending WiFi service credentials to the Li-Fi AP, comprises:
   sending a message that is addressed to the Li-Fi AP and contains the WiFi service credentials through one of: a wired network connection to the Li-Fi AP; and a WiFi RF connection to the Li-Fi AP.

4. The method of claim 1, wherein sending WiFi service credentials to the Li-Fi AP, comprises:
   sending a message, which is addressed to the Li-Fi AP and contains the WiFi service credentials, to a sound emitter device to generate sound signaling that transports the message to the Li-Fi AP.

5. The method of claim 1, wherein sending WiFi service credentials to the Li-Fi AP, comprises:
   sending a message that is addressed to the Li-Fi AP and contains a Service Set Identifier (SSID) for a WiFi network provided by the WiFi AP; and sending another message that is addressed to another Li-Fi AP, which is separate and spaced apart from the Li-Fi AP, and contains an access key for the WiFi network, wherein the receiving and authenticating of the authentication request which is generated by the wireless device based on the SSID and the access key.

6. The method of claim 1, further comprising:
determining which Li-Fi APs among the set of Li-Fi APs are at locations where a WiFi RF connection is allowed to be established with the WiFi AP, based on accessing a data structure repository that associates identifiers of the Li-Fi APs in the set of Li-Fi APs with indications of whether the associated Li-Fi APs are located where WiFi RF connections are allowed to be established with the WiFi AP.

7. The method of claim 1, wherein sending WiFi service credentials to the Li-Fi AP comprises:
splitting the WiFi service credentials into a plurality of chunks;
spreading the plurality of chunks across a plurality of messages;
embedding a sequence number in each of the plurality of messages that indicates locations of the chunks in a sequence to be use by the wireless device to re-generate the WiFi service credentials from the plurality of chunks; and
sending the plurality of messages to the Li-Fi AP.

8. The method of claim 7, wherein sending WiFi service credentials to the Li-Fi AP, comprises:
addressing at least some of the plurality of messages to different ones of a plurality of Li-Fi APs that includes the Li-Fi AP; and
sending the plurality of messages to the addressed ones of the plurality of Li-Fi APs.

9. A WiFi access point, AP, comprising:
at least one transceiver;
at least one processor coupled to the at least one transceiver; and
at least one memory coupled to the at least one processor and storing program code that when executed by the at least one processor causes the at least one processor to perform operations comprising:
selecting a Light Fidelity, Li-Fi AP from among a set of Li-Fi APs, which are dispersed within a building and each communicatively connected to the WiFi AP, based on the Li-Fi AP being determined to be at a location within the building wherein a WiFi RF connection is allowed to be established;
sending WiFi service credentials to the Li-Fi AP for transmission through Li-Fi signaling that is broadcast for reception by wireless devices;
prohibiting sending of the WiFi service credentials to at least one other Li-Fi AP among the set of Li-Fi APs based on the other Li-Fi AP being determined to be at another location within the building where the WiFi RF connection is not allowed to be established;
receiving and authenticating an authentication request received via a RF transceiver of the WiFi AP from the wireless device responding to the WiFi service credentials that were broadcast through the Li-Fi signaling; and
establishing the WiFi RF connection with the wireless device responsive to the authentication.

10. The WiFi AP of claim 9, wherein sending WiFi service credentials to the Li-Fi AP comprises:
splitting the WiFi service credentials into a plurality of chunks;
spreading the plurality of chunks across a plurality of messages;
embedding a sequence number in each of the plurality of messages that indicates locations of the chunks in a sequence to be use by the wireless device to re-generate the WiFi service credentials from the plurality of chunks; and
sending the plurality of messages to the Li-Fi AP.

11. The WiFi AP of claim 10, wherein the sending of the WiFi service credentials comprises operations to:
address at least some of the plurality of messages to different ones of a plurality of Li-Fi APs that includes the Li-Fi AP; and
send the plurality of messages to the addressed ones of the plurality of Li-Fi APs.

12. A method by a wireless device that sets-up a WiFi connection with a WiFi access point, AP, the method comprising:
selecting a Light Fidelity, Li-Fi AP from among a set of Li-Fi APs, which are dispersed within a building and each communicatively connected to the WiFi AP, based on the Li-Fi AP being determined to be at a location within the building wherein a WiFi RF connection is allowed to be established;
receiving WiFi service credentials through Li-Fi signaling from the Li-Fi AP that is broadcast for reception by wireless devices;
prohibiting receiving of the WiFi service credentials from at least one other Li-Fi AP among the set of Li-Fi APs based on the other Li-Fi AP being determined to be at another location within the building where the WiFi RF connection is not allowed to be established;
sending an authentication request through a RF transceiver of the wireless device to the WiFi AP, the authentication request being generated based on the WiFi service credentials received through the Li-Fi signaling; and
establishing the WiFi RF connection with the WiFi AP based on the authentication request.

13. The method of claim 12, wherein the WiFi service credentials comprise a Service Set Identifier (SSID) for a WiFi network provided by the WiFi AP and an access key for the WiFi network.

14. The method of claim 12,
wherein the WiFi service credentials are received from the Li-Fi AP as Li-Fi encoded WiFi service credentials, and
further comprising decoding the Li-Fi encoded WiFi service credentials to extract the WiFi service credentials.

15. The method of claim 12, wherein receiving WiFi service credentials through Li-Fi signaling from a Li-Fi AP that is broadcast for reception by wireless devices, comprises:
receiving a message from the Li-Fi AP containing a Service Set Identifier (SSID) for a WiFi network provided by the WiFi AP; and
receiving another message from another Li-Fi AP, which is separate and spaced apart from the Li-Fi AP, and contains an access key for the WiFi network,
wherein the authentication request is generated based on the SSID and the access key.

16. The method of claim 12, wherein receiving WiFi service credentials through Li-Fi signaling from the Li-Fi AP comprises:
splitting the WiFi service credentials into a plurality of chunks;

spreading the plurality of chunks across a plurality of messages;

embedding a sequence number in each of the plurality of messages that indicates locations of the chunks in a sequence to be use by the wireless device to re-generate the WiFi service credentials from the plurality of chunks; and receiving the plurality of messages through the Li-Fi signaling from the Li-Fi AP.

17. The method of claim 16, wherein receiving WiFi service credentials through Li-Fi signaling from a Li-Fi AP that is broadcast for reception by wireless devices, comprises:

receiving the plurality of chunks that are spread across the plurality of messages that are received by the wireless device through Li-Fi signaling from a plurality of the Li-Fi APs which includes the Li-Fi AP, wherein the WiFi AP formed the plurality of chunks spread across the plurality of messages by splitting the WiFi service credentials into the plurality of chunks; and re-generating the WiFi service credentials from the plurality of chunks.

18. The method of claim 17, wherein re-generating the WiFi service credentials from the plurality of chunks, comprises:

determining locations of the plurality of chunks in a sequence for which they are to be used when re-generating the WiFi service credentials, based on a sequence number embedded in each of the plurality of messages by the WiFi AP.

19. A wireless device comprising:

at least one transceiver;

at least one processor coupled to the at least one transceiver; and at least one memory coupled to the at least one processor and storing program code that when executed by the at least one processor causes the at least one processor to perform operations comprising:

selecting a Light Fidelity, Li-Fi AP from among a set of Li-Fi APs, which are dispersed within a building and each communicatively connected to the WiFi AP, based on the Li-Fi AP being determined to be at a location within the building wherein a WiFi RF connection is allowed to be established;

receiving WiFi service credentials through Li-Fi signaling from the Li-Fi AP that is broadcast for reception by wireless devices;

prohibiting receiving of the WiFi service credentials from at least one other Li-Fi AP among the set of Li-Fi APs based on the other Li-Fi AP being determined to be at another location within the building where the WiFi RF connection is not allowed to be established;

sending an authentication request through a RF transceiver of the wireless device to the WiFi access point, the authentication request being generated based on the WiFi service credentials received through the Li-Fi signaling; and establishing a WiFi RF connection with the WiFi AP based on the authentication request.

20. The wireless device of claim 19, wherein receiving WiFi service credentials through Li-Fi signaling from the Li-Fi AP comprises:

splitting the WiFi service credentials into a plurality of chunks;

spreading the plurality of chunks across a plurality of messages;

embedding a sequence number in each of the plurality of messages that indicates locations of the chunks in a sequence to be use by the wireless device to re-generate the WiFi service credentials from the plurality of chunks; and receiving the plurality of messages through the Li-Fi signaling from the Li-Fi AP.

21. The wireless device of claim 20, wherein the receiving WiFi service credentials through Li-Fi signaling from a Li-Fi AP that is broadcast for reception by wireless devices, comprises:

receiving the plurality of chunks that are spread across the plurality of messages that are received by the wireless device through Li-Fi signaling from a plurality of the Li-Fi APs which includes the Li-Fi AP, wherein the WiFi AP formed the plurality of chunks spread across the plurality of messages by splitting the WiFi service credentials into the plurality of chunks; and re-generating the WiFi service credentials from the plurality of chunks.

* * * * *